No. 844,831. PATENTED FEB. 19, 1907.
J. C. SMITH.
SCREW CUTTING LATHE.
APPLICATION FILED MAY 12, 1905.
4 SHEETS—SHEET 3.
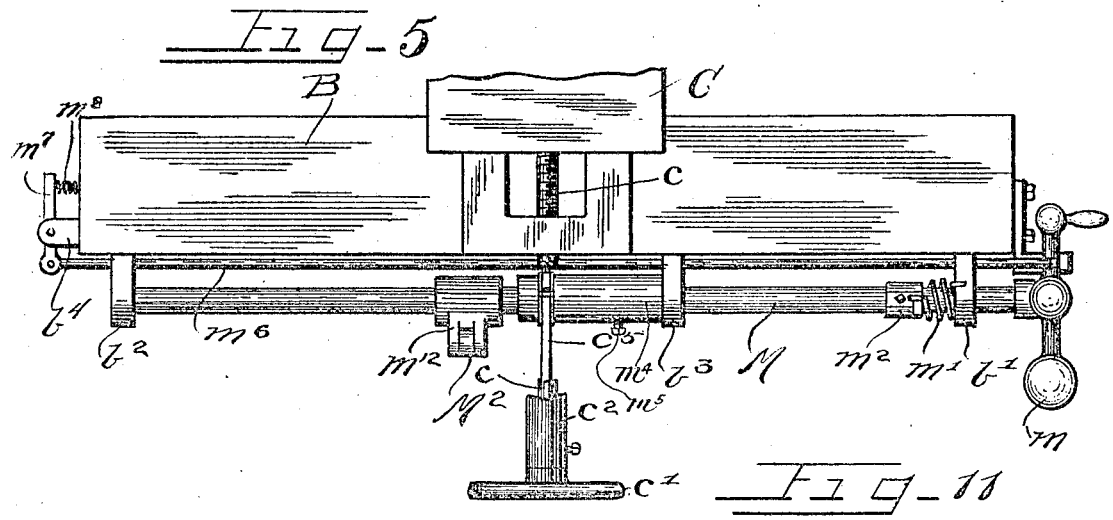
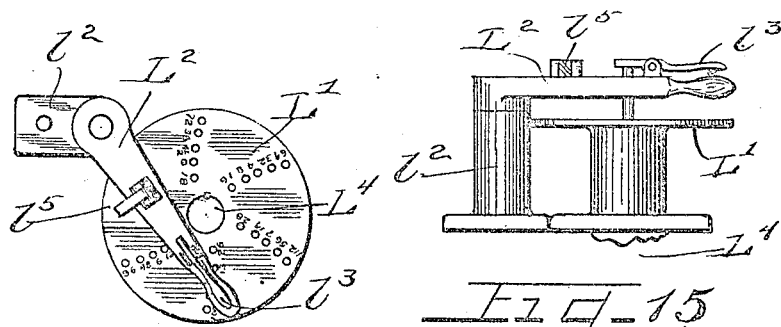
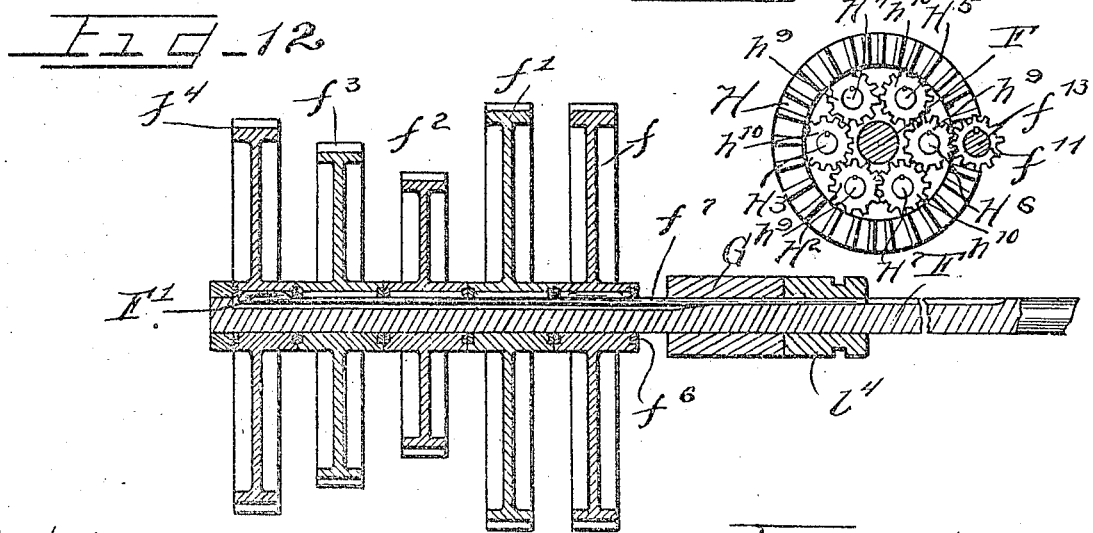
Witnesses
J. W. Angell.
W. W. Withenbury.
Inventor
James C. Smith
by Charles W. Hills Atty.

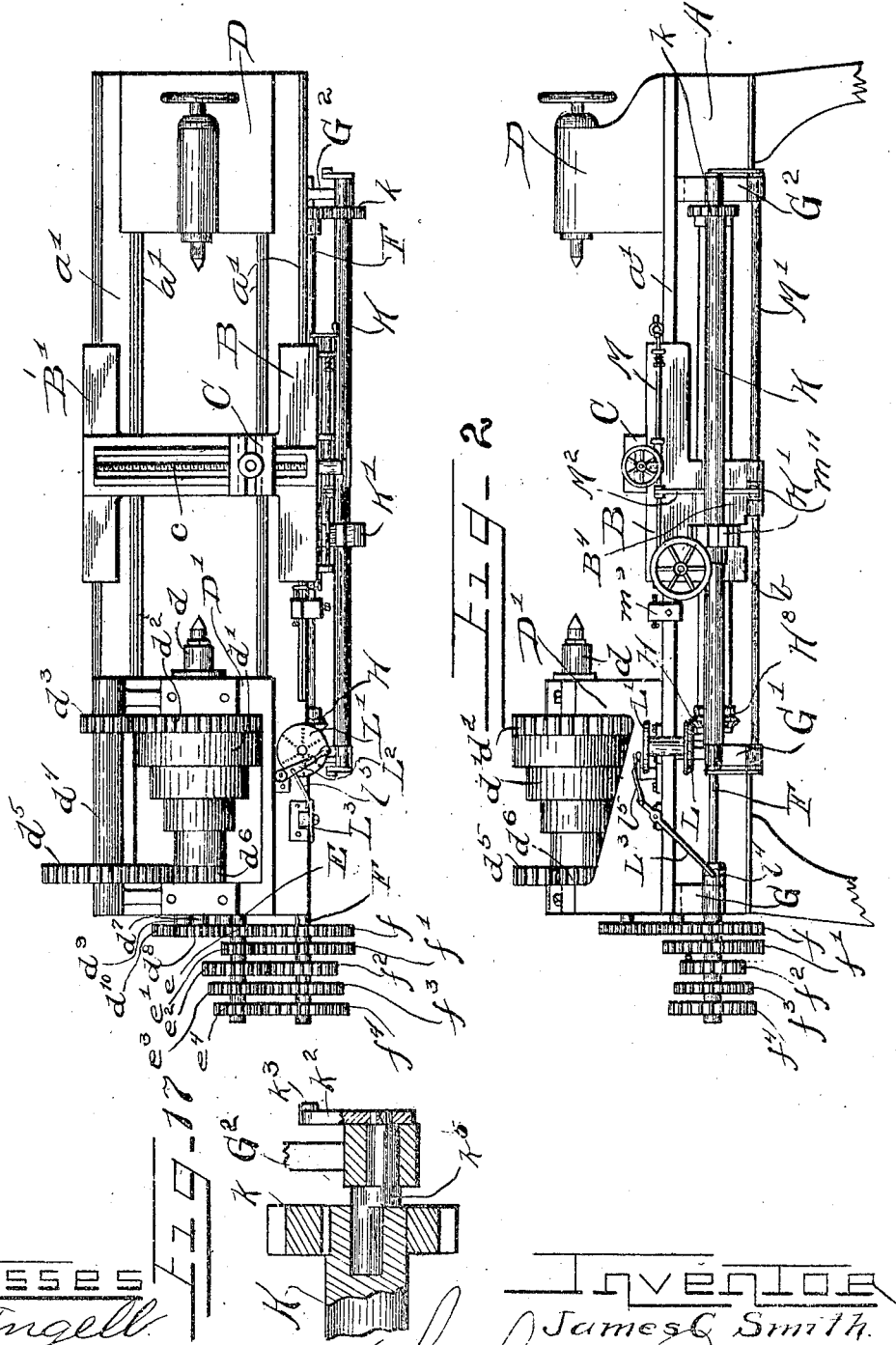

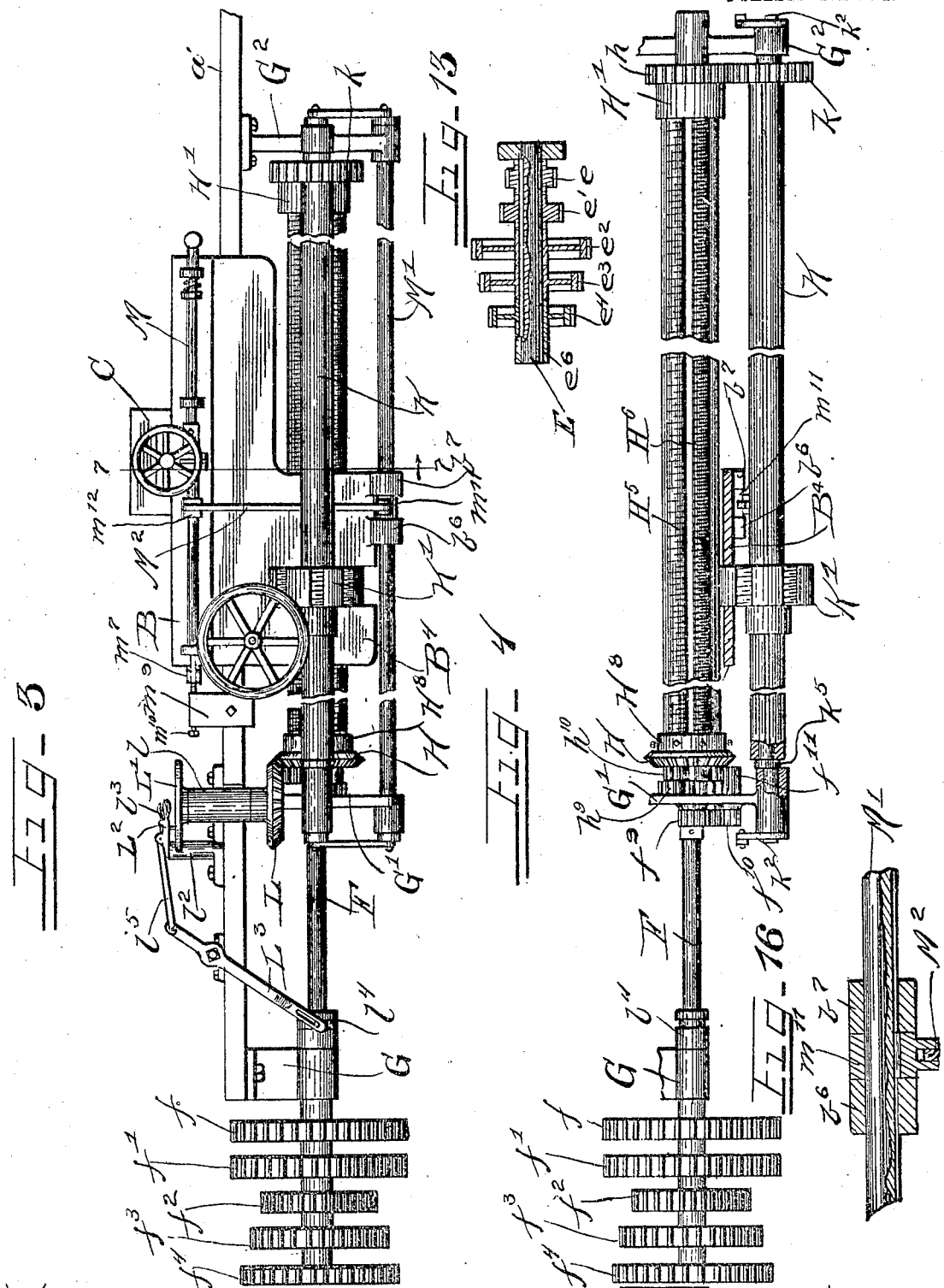

No. 844,831. PATENTED FEB. 19, 1907.
J. C. SMITH.
SCREW CUTTING LATHE.
APPLICATION FILED MAY 12, 1905.
4 SHEETS—SHEET 4.
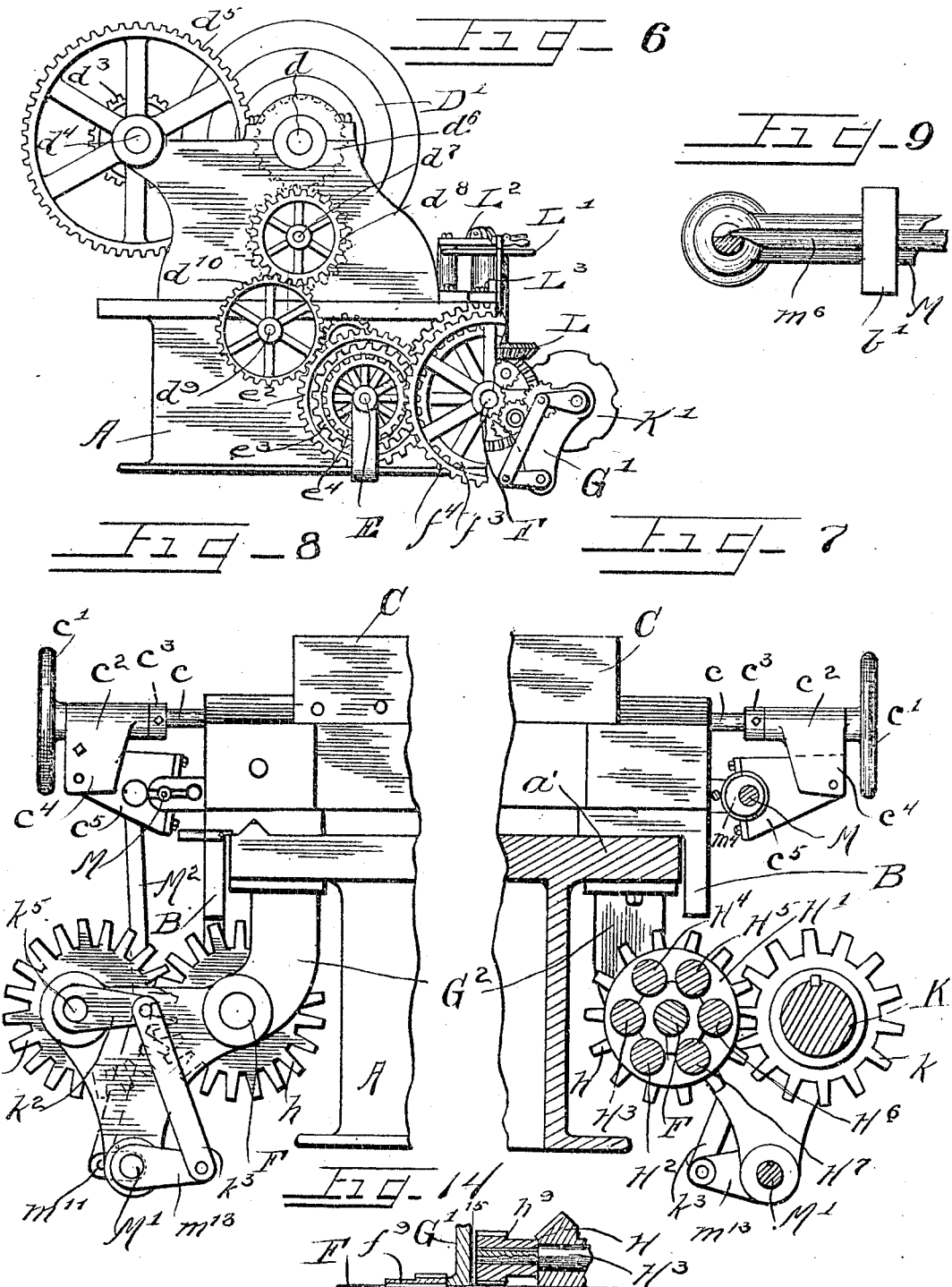

UNITED STATES PATENT OFFICE.

JAMES C. SMITH, OF CHICAGO, ILLINOIS.

SCREW-CUTTING LATHE.

No. 844,831. Specification of Letters Patent. Patented Feb. 19, 1907.

Application filed May 12, 1905. Serial No. 260,078.

*To all whom it may concern:*

Be it known that I, JAMES C. SMITH, a citizen of the United States, and a resident of the city of Chicago, in the county of Cook and State of Illinois, have invented certain new and useful Improvements in Screw-Cutting Lathes; and I do hereby declare that the following is a full, clear, and exact description of the same, reference being had to the accompanying drawings, and to the letters of reference marked thereon, which form a part of this specification.

This invention relates to improvements in screw-cutting lathes.
Screw-cutting lathes have heretofore been constructed with trains of intermeshing gears removably secured upon their shafts driving to the feed mechanism of the carriage, and the change of feed necessary to cut threads of different lead have usually been effected by removing one set of gears and replacing others adapted to drive the feed-shaft at the desired rate. Where the changes in the rate of feed are effected in this manner, it requires considerable time to make the changes from one feed to another, and in shops where such changes are frequently necessary a large amount of time is thus wasted.

The object of this invention is to afford feed mechanism for screw-cutting lathes of such a nature that the lathe can be quickly adjusted to cut any one of many different leads without the removal or insertion of gears or other operating parts.
It is also an object of this invention to afford a simple, durable, and easily-operated feed mechanism automatically operating in shifting, thereby enabling a lathe of the class described to be operated by one not previously skilled in the use of the same and enabling a workman without previous experience to adjust the lathe immediately for any one of the many leads of thread possible.

The invention consists in the matters hereinafter described and more fully pointed out and defined in the appended claims.

In the drawings, Figure 1 is a top plan view of a lathe embodying my invention. Fig. 2 is a side elevation of the same. Fig. 3 is an enlarged side elevation. Fig. 4 is a fragmentary horizontal section of a part of the feed mechanism. Fig. 5 is an enlarged plan view of the releasing and adjusting mechanism. Fig. 6 is an end elevation of the lathe. Fig. 7 is an enlarged section on line 7 7 of Fig. 3. Fig. 8 is a fragmentary rear end view of the feed mechanism. Fig. 9 is an enlarged detail of a part of the releasing mechanism. Fig. 10 is a top plan view of the dial and shifting-lever. Fig. 11 is a side elevation of the same. Fig. 12 is a longitudinal section of the feed-shaft and driving-gears. Fig. 13 is a longitudinal section of the transmitting-gears. Fig. 14 is an enlarged longitudinal section of the gears for the gang of screw-shafts. Fig. 15 is a section taken on line 15 15 of Fig. 14. Fig. 16 is an enlarged detail of a part of the lower releasing-shaft. Fig. 17 is an enlarged detail of the eccentric bearing for the die-shaft.

As shown in said drawings, A indicates the bed of the lathe as a whole, which may be constructed in the usual or any desired manner, and upon side frame members, each of which, as is usual, is provided ways $a'$, upon which slide the carriage B B', upon which is carried the transversely-movable cross-slide C, whereby the tool is adjusted to its work. At the rear end of the lathe is the usual tail-stock D, and at the front end of the lathe is the head-stock D', constructed as is usual and in which is journaled the arbor $d$, upon which the work is supported and rotated and which is driven at varying speeds from the graduated cone-pulleys $d'$. Also carried upon the arbor $d$ at the inner end of the pulley is the large gear $d^2$, which intermeshes with a pinion $d^3$ on a counter-shaft $d^4$, on which is secured a gear $d^5$, meshing with a pinion $d^6$, secured at the front end of said arbor. Said pinion $d^6$ intermeshes with a corresponding gear on a shaft $d^7$, journaled at the end of the head-stock below the arbor, and at the outer end of said shaft is secured a gear $d^8$, which intermeshes with a gear $d^{10}$, journaled on a stud-shaft $d^9$ on the end of the lathe-bed. Also intermeshing with the gear $d^{10}$ is a gear $e$, journaled on a stud-shaft E, rigidly secured on the lathe end. The gear $e$ is rigidly connected with gears $e'$, $e^2$, $e^3$, and $e^4$ on said shaft, which, as shown, are of different size, of which $e$ and $e'$ are gears or pinions of small size and the gears $e^2$, $e^3$, and $e^4$ are graduated sizes, the gear $e^2$ being larger than the gear $e^4$.

Rigidly secured beneath the ways on the frame at the front side of the same are brackets G, G', and G², and journaled in said brackets beneath the top of the frame is a feed-shaft F, the end of which projects beyond the front end of the lathe parallel with the stud-shaft E, and journaled on the protruding end of said shaft are gears $f$, $f'$, $f^2$, $f^3$ and $f^4$, respectively corresponding with and intermeshing with the gears $e$, $e'$, $e^2$ $e^3$, and $e^4$. Said gears are each provided with a slightly-elongated hub each provided with a key-seat therein corresponding with the spline-seat in the shaft F, and in each end of each hub is inserted a collar of metal, $f^6$, which is not key-seated, thus affording within the hub of each gear a pocket adapted to receive the relatively short feather F', adapted to be shifted into position to engage any one of said gears to the shaft, but is prevented from engaging two of said gears simultaneously, owing to said collar $f^6$. A rod or pen $f^7$ is integrally connected with said feather and extends the length of the spline-seat in said shaft and through the bearing in the bracket G and affords means for shifting the feather as desired.

Rotatively secured upon the feed-shaft F at the rear of the bracket G' is a beveled gear H, and at the rear end of the feed-shaft adjacent the bracket G² is a collar H', secured to rotate on said shaft and secured to which is a gear $h$, having relatively long teeth. A hub H⁸ is provided on said beveled gear, and journaled in said beveled gear H, hub H⁸, and collar H' are a plurality of threaded shafts, as shown six in number, at equal radial distances from the shaft F and indicated by H², H³, H⁴, H⁵, H⁶, and H⁷, respectively, and each having a different lead of thread. The front end of each threaded shaft projects through the beveled gear H, and secured on each is a short pinion $h^9$ or $h^{10}$, of which the pinions $h^{10}$ are arranged close to the face of the beveled gear H, and the pinion $h^9$ projects beyond the same close to the bracket G', thus enabling any of said shafts to be driven independently by means of said pinions.

A gear $f^9$ is secured on the feed-shaft F, which intermeshes with a gear $f^{12}$, journaled on the bracket G', and this intermeshes with the gear $f^{10}$, secured on one end of a short shaft $f^{13}$, which extends through the bracket G' and is provided on its inner end with a long pinion $f^{11}$, positioned to mesh with any of the pinions $h^9$ or $h^{10}$, secured alternately on the front ends of each screw-shaft, when the gang of shafts is rotated to the proper position.

Journaled on gudgeons $k^5$, extending axially into its ends and which are provided with opposite offset end portions which extend through and are journaled in the brackets G and G², is a shaft K opposite and parallel with the shaft F, and splined thereon a slidable die K', in the periphery of which is provided semicylindric seats corresponding in number with the number of screw-shafts in the gang and provided with internal screw-threads complemental therewith. The inner side of the die projects through the apron B⁴ of the carriage and is adapted to be swung into engagement with the respective screw-shafts and to be moved thereby longitudinally of the shaft K, propelling the carriage. Said shaft K is provided at its rear end with a gear $k$, rigidly secured thereon and provided with long teeth which intermesh with the corresponding teeth on the gear $h$, so that rotation of the beveled gear H and gear $h$ to bring a given screw-shaft into operative relation produces corresponding rotation of the shaft K to bring the appropriate female member of the die into engagement therewith. Means are provided for rotating said beveled gear H and adjusting any of said screw-shafts with the die, comprising a vertical shaft L⁴, journaled in a bracket $l$, rigidly secured at the side of the frame. At the lower end of said shaft is secured a beveled gear L, intermeshing with the beveled gear H, and at the upper end of the shaft is secured a dial L', provided in its face with lines of approximately radially arranged apertures or seats, one line for each of the screw-shafts and marked to indicate the various leads of thread capable of construction by the use of said particular screw-shaft as a feed-shaft. A lever L² is pivoted upon a standard $l^2$ in position to swing across the top of the dial, and a spring-detent $l^3$ is provided in said lever adapted to engage in the respective notches or apertures in the dial, one of which is provided in each line of apertures or seats for each of the gears on the feed-shaft F. A lever L³ is fulcrumed on the side of the frame and at its lower end engages a collar $l^4$, rigidly engaged on the pen of the feather $f^7$ and which acts to adjust the same longitudinally of the shaft F. A connecting-rod $l^5$ joins the upper end of the lever L³ with the middle part of the lever L², so that adjustment of said lever L² into any of the notches or apertures in the dial for a given screw-shaft acts to shift the feather into position to engage the corresponding driving-gear to the speed-shaft F. Thus each notch or aperture in the dial affords a different speed for a given screw-shaft.

Journaled on the front face of the carriage near the top of the same and journaled in lugs or brackets $b'$, $b^2$, and $b^3$, secured to the carriage, is an adjusting-shaft M, provided at one end with a crank $m$ for rotating the same and upon which is secured a torsion-spring $m'$, one end of which is engaged upon a bracket $b'$ and the other of which is positively engaged on a collar $m^3$, adjustably secured on the said shaft. The cross-slide C is fed transversely, as is usual, by means of a threaded shaft $c$, operated, as shown, by hand-wheels $c'$, and, as shown, a sleeve $c^2$ is secured on the outer unthreaded end of said screw-shaft adjacent the hand-wheel by means of a collar $c^3$. Said sleeve is provided with a downwardly-extending arm $c^4$, to which is pivotally secured a plate or link $c^5$, the inner end of which affords a yoke for an eccentric wheel $m^4$, rigidly but adjustably secured on the shaft M by means of a set-screw $m^5$, so that when the tool is adjusted in cutting relation the cross-slide is held by said shaft; but when the shaft M is partly turned upon its axis the cross-slide and tools secured thereon are immediately retracted.

Mechanism is provided adapted to hold the shaft M in position to bear the thrust against the cross-slide C, comprising, as shown, a rod $m^6$, slidably engaged through the brackets $b'$, $b^2$, and $b^3$, parallel with the shaft M. Said rod is beveled at one end to engage over the hand lever or crank $m$ and at the other end is pivotally engaged with a lever $m^7$, fulcrumed on a bracket $b^4$, secured on the end of the carriage B, and a pushing-spring $m^8$ engages beneath the end of said lever and holds said rod normally in engagement with the lever $m$. As shown, a stop $m^9$ is adjustably secured upon the frame on the bed of the lathe and provided with a set-screw $m^{10}$, extending therethrough in position to engage the end of said lever $m^7$ as the carriage approaches the limit of its movement toward the head-stock and by forcing the lever $m^7$ inwardly retracts the rod $m^6$, whereupon the torsion-spring rotates the shaft M, retracting the tool from the cut.

As shown, means are provided for stopping the feed of the carriage longitudinally simultaneously with the retraction of the cross-slide. For this purpose a shaft M' is journaled at the lower ends of the brackets G' and $G^2$, and said shafts K and M' are each provided at their ends with inwardly-directed crank-arms $k^2$ and $m^{13}$, respectively, and are pivotally connected by means of a connecting rod or link $k^3$, as shown in Fig. 8. Said shaft M' also extends through and is journaled in knuckles $b^6$ and $b^7$ at the lower edge of the apron of the carriage B, and secured between said knuckles is a lever-arm $m^{11}$, corresponding with a lever-arm $m^{12}$ on the shaft M, and a rod $M^2$ positively connects said levers at their ends, so that movement of the shaft M produces corresponding movement in the shaft M' and rocks the shaft K, swinging the die out of engagement with its shaft.

The operation is as follows: When it is desired to use the lathe for screw-cutting purposes, the lead of threads desirable is determined upon and the dial turned to enable the appropriate screw-shaft to be engaged by its die on the shaft K. As the dial is turned the gear L at the lower end of the shaft for said dial rotates the gang of screw-shafts, bringing the one selected approximately opposite the die-shaft K, and owing to the geared connection at the ends of the gang and the shaft K the die K' is also rotated, bringing the appropriate female member into position to receive the selected screw-shaft when the dial is adjusted. The lever $L^2$ is then adjusted, bringing its detent into engagement in the notch marked with the number of the thread desired to be used, and the adjustment of said lever acts to hold the die and screw-shaft in engagement and to shift the feather into engagement with the appropriate gear in the feed-shaft. Said gears are so proportioned and arranged one in relation to the other as to enable when five gears are used five leads of thread to be secured by the use of each screw-shaft, though obviously by using a greater number of driving-gears on the feed-shaft F the number of leads of thread secured by any given shaft can be increased. The adjustment of the screw-shaft with the corresponding female member of the die on the shaft K, owing to the connection between the shaft K and M' and the connection between the latter and the shaft $m$, acts to rock said shaft M, moving the cross-slide inwardly until the eccentric on said shaft is in the position indicated in Fig. 7. The hand-wheel $c'$ is then rotated to adjust to the desired depth of cut, and the mechanism is thus locked in adjusted position until the cut is completed, as before described. The eccentric $m^4$ may be adjusted by means of the set-screw $m^5$, if desired, to throw the cross-slide inwardly instead of outwardly when the shaft M is reversed. This is of great importance when cutting internal threads, as in a nut or a pipe, and obviously if the eccentric be detached from its shaft and held from movement in the link $c^5$ the cross-slide C can be operated as is usual for other lathes.

While I have described but six screw-shafts driven from the feed-shaft, it is obvious that a greater or less number may be employed, if desired, and also that a greater or less number of driving-gears may be provided upon said shaft and the stud-shaft E or that the trains of gears whereby the gears on said shaft E are actuated can be varied and that my invention may be embodied in other mechanical tools than a lathe proper. I therefore do not purpose limiting this application otherwise than necessitated by the prior art, as obviously many details of construction and operation may be varied without departing from the principles of this invention.

I claim as my invention—

1. In a lathe the combination with a short shaft of a plurality of driving-gears thereon, a feed-shaft journaled on the frame parallel with said short shaft, a plurality of rotatable gears on one end thereof each meshing with one of the driving-gears, a rod provided with a feather for holding any one of said gears in rigid engagement with the shaft, a plurality of screw-shafts each having a different pitch arranged concentric with said feed-shaft, a beveled gear journaled on said feed-shaft and engaging the ends of said screw-shafts, a vertical shaft journaled on the frame, a beveled gear on one end thereof intermeshing with the aforesaid beveled gear, a dial on the opposite end of said shaft, a train of gears connecting the feed-shaft with said screw-shafts and adapted to drive any one of the same, a die-block provided with a plurality of thread-engaging portions having threads of different pitch corresponding to the threads on the screw-shaft, means for adjusting the same simultaneously with the screw-shafts into position for one of the threaded portions to engage with a correspondingly-threaded screw-shaft, a carriage movable by said die-block and means connecting said dial with said rod whereby to lock the appropriate one of said rotatable gears to the feed-shaft.

2. In a lathe the combination with driving-gears of a rotative feed-shaft, revoluble gears on one end thereof, means for rigidly engaging any one of said gears with the shaft, a lever controlling the same provided with a locking-pin, an apertured dial adapted to be engaged by said locking-pin to hold said lever in adjusted position, a gang of screw-shafts having threads of different pitch carried on and arranged parallel with and around the feed-shaft, a die-shaft parallel with said feed-shaft, a carriage, a rotatable die-block on said die-shaft projecting through the front of the carriage and having dies therein, having threads corresponding respectively to the threads on the screw-shafts, intermeshing gears carried on the end of the feed-shaft and the die-shaft, means connecting the dial with the gang of screw-shafts and adapted to rotate the same so as to bring any one of the screw-shafts into engagement with the respective die of the die-block, a pinion driven from the feed-shaft, non-connected pinions on said screw-shafts each adapted to mesh with said pinion whereby any one of said screw-shafts may be driven independently of the others.

3. In a machine of the class described the combination with a carriage and a rotatable feed-shaft, of a plurality of different-sized gears for varying the rate of drive of the feed-shaft, a feather adapted to firmly engage any one of said gears to the feed-shaft, a lever for adjusting said feather into engagement with any one of said gears, a beveled gear journaled on said feed-shaft, a plurality of screw-shafts journaled at their ends therein, a gear on the other end of the feed-shaft affording journals for the corresponding ends of said screw-shafts, gears on said screw-shafts adapted to engage a pinion driven by said feed-shaft whereby any one may be driven, a shaft parallel with said feed-shaft, a carriage movable longitudinally thereof, a die engaged a said shaft and adapted to move the carriage, a shaft having a beveled gear meshing with said beveled gear on the feed-shaft and connections between said shaft having a bevel-gear and said lever whereby the die and screw-shafts are simultaneously adjusted to operative position.

4. In a machine of the class described the combination with a feed-shaft of a plurality of rotatable gears journaled thereon, a feather adapted to rigidly engage one of said gears with the shaft, a plurality of differently-threaded screw-shafts surrounding said feed-shaft, a pinion on the end of each screw-shaft, a pinion on said feed-shaft, a pinion connecting the pinions on the feed-shaft and screw-shafts and adapted to drive any one of said screw-shafts, a dial having a plurality of rows of apertures thereon, each row appropriated to one of said screw-shafts, an adjusting-lever connected with said feather and a pin thereon adapted to engage in said apertures thereby regulating the speed of said screw-shafts, a shaft, a die slidably engaged thereon said die having a plurality of faces one for each screw-shaft, a carriage operated by said die and means connected with said dial adapted when the same is actuated to actuate one of said screw-shafts, to engage its complemental die-face.

5. The combination with a frame, carriage, head-stock and arbor, of a stud-shaft on the end of the frame, a plurality of rigidly-connected gears rotatable thereon and of different sizes, intermeshing gears connecting said arbor and one of the gears on said stud-shaft, a feed-shaft, a plurality of gears on one end thereof, each complemental with the corresponding gear on the stud-shaft and independently revoluble, a relatively short feather on the feed-shaft adapted to engage any one of said gears in driving engagement thereto, a rod integral with said feather and extending longitudinally of said feed-shaft, a lever engaged to said rod and pivoted to the frame, a dial having rows of alined apertures therein, a lever engaged with the aforesaid lever and adapted to engage in said apertures to regulate the speed of the feed-shaft, a plurality of screw-shafts concentrically arranged with said feed-shaft, a die having faces corresponding to said screw-shafts and carried on a shaft parallel with said feed-shaft, means engaged to said dial for revolving said screw-shafts, means for adjusting one of said die-faces in operative position with its complemental screw-shaft and means connecting said feed-shaft and screw-shafts whereby the screw-shafts are driven at feed-shaft rate.

6. The combination with a lathe-bed, carriage, head-stock and arbor of a revoluble feed-shaft journaled at the side of the bed, a stud-shaft on the end of the bed, a plurality of rigidly-connected gears rotatable thereon and of different sizes, driving connections between the arbor and one of said gears, a plurality of gears each complemental with the corresponding gear on the stud-shaft and independently revolvable on the feed-shaft, a rod provided with relatively short feather adapted to engage any one of said gears in driving engagement with the feed-shaft, a lever for adjusting said feather, a dial having rows of alined apertures therein, a lever connected to said lever engaging the rod and having a projection adjustable in said apertured dial to regulate the speed of the feed-shaft, a plurality of threaded shafts rotated from the feed-shaft and parallel therewith, a die for each engaging the carriage and means operated by the dial for engaging any of said screw-shafts with its die to move the carriage.

7. The combination with a lathe-bed, carriage, head-stock and arbor, of a revoluble feed-shaft journaled at the side of the bed, a stud-shaft on the end of the frame, a plurality of rigidly-connected gears rotatable thereon and of different sizes, driving connections between the arbor and one of said gears, a plurality of gears on the feed-shaft each complemental with the corresponding gear on the stud-shaft and independently revoluble, a relatively short feather adapted to engage any one of said gears in driving engagement, a lever for adjusting said feather, a dial indicating the adjustment, a plurality of threaded shafts each having a different lead, and driven from the feed-shaft, a die for engaging the carriage with each shaft and means operated by the movement of the indicating-dial to engage any one of the respective threaded shafts, with its die whereby the rate of the speed is determined by the gears engaged to the feed-shaft and the threaded shaft engaged to the die.

8. In a device of the class described the combination with a screw-shaft and its complemental die, a carriage, a shaft journaled on said carriage, a cross-slide carried on said carriage, a tool thereon, means on said shaft adapted to adjust the depth of said tool, a lever on the end of said shaft, a detent adapted to engage said shaft and hold the tool in cutting position, a stop engaged to the frame for releasing said detent, means on said shaft for releasing said tool from the cut and operative connections between said shaft on the carriage and screw-shafts and die adapted when the tool is retracted from the cut to release the die from the screw-shaft.

9. In a device of the class described the combination with a screw-shaft of a die therefor, a carriage, a torsion-shaft journaled on said carriage, a cross-slide carried on said carriage, a screw-shaft engaging said cross-slide adapted to regulate the depth of cutting, a detent adapted to hold said torsion-shaft, means in the paths of its movement for releasing said detent, tension means acting to partially rotate said torsion-shaft and operative connections between said torsion-shaft and die adapted to release the die from the screw-shaft.

10. In a machine of the class described the combination with a feed-shaft independently rotatable gears thereon, of a beveled gear rotatably engaged on said shaft near one end and a spur-gear near the other, a plurality of threaded shafts each having a different lead of thread and journaled in said gear and beveled gear around the shaft, a dial, connections between said dial and first-named gears, an adjusting-shaft on said dial, a beveled gear thereon meshing with that on the feed-shaft, a pinion on the feed-shaft, a pinion projecting beyond the beveled gear on each of the threaded shafts and an intermediate pinion adapted to drive any of said shafts from the feed-shaft, a die-shaft parallel with the feed-shaft, a die-block feathered thereon and having threaded seats complemental with the threaded shaft.

11. In a device of the class described the combination with a lathe, carriage and feed mechanism therefor and means whereby the feed mechanism may be disconnected from the carriage, of a shaft journaled longitudinally of the carriage, a detent holding said shaft normally from movement, an adjustable stop on the lathe positioned to release the detent at the end of the cut, a torsion-spring adapted to partially rotate said shaft, a cross-slide, operative connections between the cross-slide and shaft adapted to retract the tool upon said rotation and operative connections between said shaft and longitudinal feed mechanism whereby the longitudinal movement of the carriage is arrested simultaneously with the retraction of the feed-tool.

12. In a machine of the class described, a knock-out or releasing mechanism, comprising in combination with the feed mechanism for the carriage, a longitudinal shaft journaled on the carriage, a detent normally holding the same, a torsion-spring acting to rotate the shaft when released, a transversely-movable cross-slide, a threaded shaft actuating said cross-slide, an eccentric carried on said longitudinal shaft and operatively connected with the threaded shaft and a stop arranged to release the detent at a predetermined point.

13. In a lathe the combination with an automatically-operating feed mechanism, of a carriage movable thereby longitudinally of the lathe, a cross-slide adjustable transversely of said carriage, a shaft journaled on said carriage, a torsion-spring thereon adapted to partly rotate the same, an eccentric on said shaft, means thereon connected with said cross-slide and adapted to support said slide against lateral thrust, a longitudinally-slidable rod on said carriage ada mally hold said shaft from rotation, a lever thereon and means adapted to operate said lever at one limit of the movement of the carriage and to release said shaft to retract the tool from the cut.

14. In a lathe the combination with a bed of a longitudinally-movable feed-carriage thereon, a feed-screw, a half-die therefor, a swinging shaft carrying said die, a torsion-shaft on the carriage having connections to the tool-holder and adapted to retract the tool by partial rotation, a crank-arm thereon, a crank-arm at each end of the swinging shaft, a longitudinal shaft provided with crank-arms connected with the crank-arms on the swinging shaft, a central crank-arm thereon and a rod connecting said crank-arm with the crank-arm on the torsion-shaft whereby rotation of the torsion-shaft acts also to disconnect the die from the feed-shaft.

In testimony whereof I have hereunto subscribed my name in the presence of two subscribing witnesses.

JAMES C. SMITH.

Witnesses:
C. M. HILLS,
W. W. WITHENBURY.